May 4, 1954 W. E. McMURRAY 2,677,533
AGITATOR FOR MIXING MACHINES
Filed July 1, 1950 2 Sheets-Sheet 1

INVENTOR.
Walter E. McMurray.
BY Knight Bros
ATTORNEYS.

May 4, 1954     W. E. McMURRAY     2,677,533
AGITATOR FOR MIXING MACHINES
Filed July 1, 1950     2 Sheets-Sheet 2

INVENTOR.
Walter E. McMurray.
BY Knight Bros
ATTORNEYS.

Patented May 4, 1954

2,677,533

UNITED STATES PATENT OFFICE 2,677,533

AGITATOR FOR MIXING MACHINES

Walter E. McMurray, Clearfield, Pa., assignor to Clearfield Machine Company, Clearfield, Pa., a corporation of Pennsylvania Application July 1, 1950, Serial No. 171,660

2 Claims. (Cl. 259—85)

This invention relates to a mixing machine and more particularly to a grinding and mixing machine of the type commonly known as a wet pan mixing machine.

The present application is a continuation in part of my pending application filed June 14, 1947, Serial No. 754,744, and relates more particularly to the agitator mounting and the muller roll arrangement shown therein.

I have found that by novel arrangement of the shafts upon which the muller-rolls rotate, spillage of material from the pan by action of the muller-rolls can be eliminated. I have also found a construction and mounting of the agitator by which it is readily possible to adjust the agitator to keep it in proper contact with the bottom of the pan to compensate for wear.

The invention is shown by way of illustration in the accompanying drawings, in which—

Figure 1:
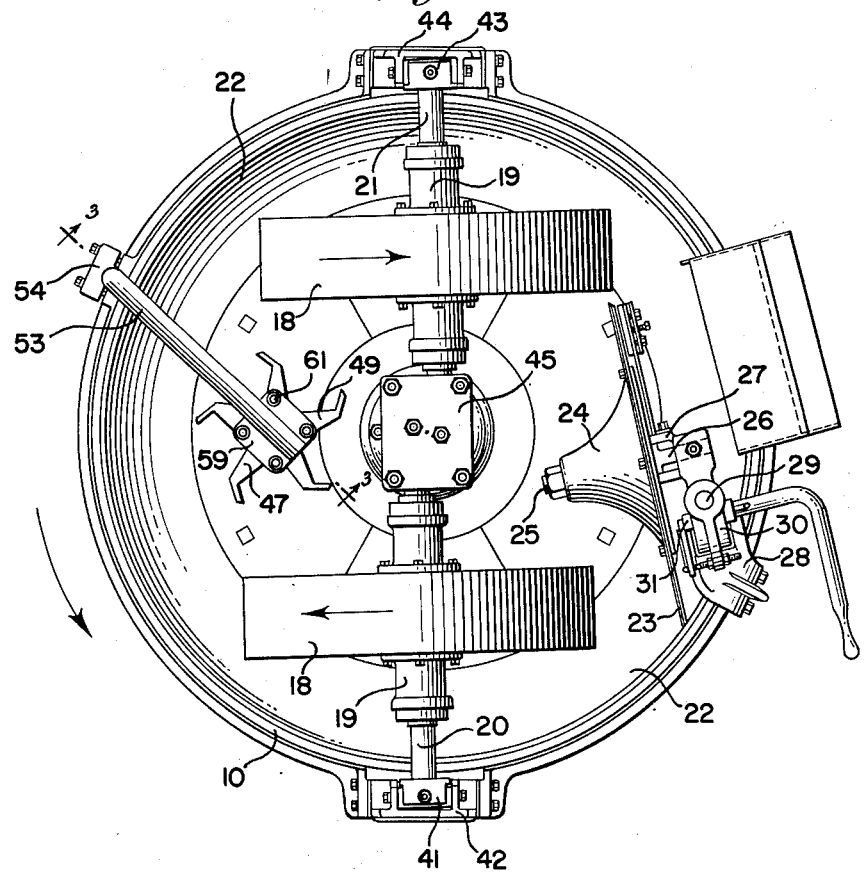
Figure 1 is a plan view of a mixing machine constructed and arranged according to the invention.

In the drawings, there is shown a mixing machine comprising a horizontal grinding and mixing pan 10, which is rotated about a vertical axis from a motor 11, the shaft 12 of which has a worm gear 13 thereon, through which a toothed wheel 14 is driven. The toothed wheel is fixed to a vertical shaft 15, having fixed to its upper end a spur gear 16, which meshes with a gear ring 17 bolted to the bottom of the pan 10, whereby the latter is rotated. Muller-rolls 18, 18 are mounted through hubs 19, 19 upon fixed shafts 20 and 21 in a position to mull or crush material in the bottom of the pan as the latter rotates.

The pan 10 has an upwardly-flared rim 22 which provides an inner surface of revolution around the rotary axis of the pan. When the pan is rotated, its contents tend to move outwardly to the rim 22, and if permitted to remain there, will not be subject to the action of the muller-rolls. Accordingly, a disc 23 is provided for scraping the material from the rim 22 and deflecting it inwardly of the pan toward the portion thereof upon which the muller-rolls act. The disc 23 is a combined scraper and emptier disc. The scraping position of the disc 23 is illustrated in Figure 1. In this position the peripheral edge of the disc is in contact along a circular arc with the surface of revolution provided by the rim 22. As illustrated in Figure 1, the pan rotates in a contra-clockwise direction. The angle which the disc makes with the pan is such that material scraped from its rim is deflected to the bottom of the pan beneath the muller-roll 18, toward which the pan rotates in passing the disc.

It is preferred to employ a rotary disc for the scraping operation as well as for the emptying operation. Accordingly, the disc is journaled for rotation within the pan. As here shown, the disc 23 is bolted to a bell-shaped member 24 which is, in turn, fixed to a journal 25, extending axially therein. The journal 25 is disposed in a substantially horizontal position, and is rotatable in a bearing member 26. The bearing member is carried by an angular support 27, which is, in turn, pivoted for horizontal movement to a stationary bracket 28 fixed outside of the pan 10 and extending thereover. Thus a vertical pin 29, transversely offset with respect to the journal 25, connects the angular support 27 to the stationary bracket. The angular support may, therefore, be swung horizontally about the pin 29 to vary the position of the disc 23 in the pan.

In the position illustrated in Figure 1, the material in the pan moving past the disc 23 and deflected along its lower surface, turns the disc, rotating it in a direction which causes its edge, as seen in Figure 1, to move downwardly of the drawing, and the journal 25 turns freely in the bearing member 26 to permit this turning of the disc. At the same time, the material in the pan is deflected from its circular path to move beneath the muller-roll beyond the disc.

If a large or hard bit of foreign matter becomes wedged beneath the disc 23, damage may result as the pan continues to rotate. The apparatus may be broken or bent. Provision is, therefore, made for permitting the disc 23 to ride up over such objects as they come in contact with the rotating disc. To this end, the angular support 27 is not pivoted directly to the bracket 28, but the pivot 29 connects the angular support 27 to a part 30, which is in turn pivoted to the stationary bracket 28 by a horizontal pin 31 which is parallel to the shaft 25. About this horizontal pin 31, the vertical pin 29, the angular support 27 and the entire disc assembly are free to move vertically.

Figure 2:
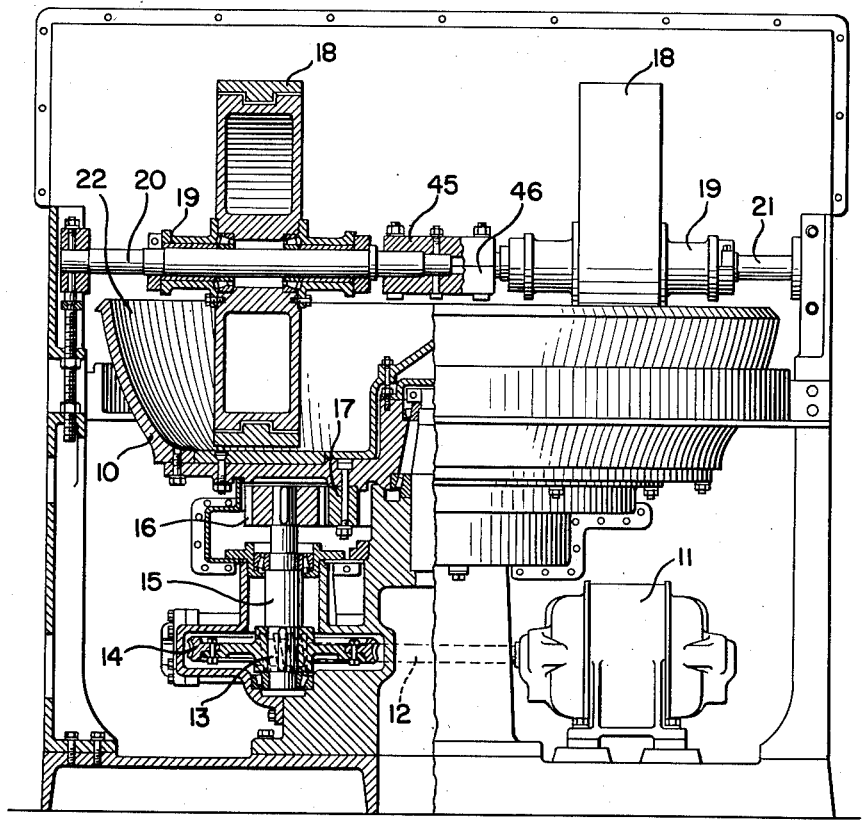
Figure 2 is an elevation of the same machine as viewed from the right in Figure 1, half of this figure being shown in vertical section, and some parts being omitted for clarity.

It has been found in machines as previously constructed that the muller-rolls have a tendency to discharge material over the rim of the pan because material at the outer edge of the roll sometimes assumes and maintains a curved shape conforming to the circular edge of the roll. Such material carried upwardly by the rising face of the roll may be discharged over the pan rim, in much the same way in which the disc 23 operates when in emptying position. By having the upwardly-turning roll edge farther from the rim than the downwardly-turning roll edge, it has been found possible to prevent such discharge of material from the pan. Special means is, therefore, provided for positioning the upwardly-turning muller-roll edge at a greater distance from the rim than the corresponding downwardly-turning edge. It is for this purpose that the muller-rolls are mounted upon separate parallel fixed shafts 20 and 21, on opposite sides of the pan diameter instead of being mounted as heretofore on a single continuous fixed shaft extending between stationary uprights immediately outside of and diametrically across the pan. Thus, the shaft 20 is fixed at its outer end in a block 41 carried by a stationary upright 42, and the outer end of the separate shaft 21 is fixed in a block 43 carried by a diametrically opposite stationary upright 44 outside of the pan. The inner ends of the shafts 20 and 21 are eccentrically clamped between members 45 and 46 (Figures 1 and 2) above the center of the pan. The inner end of each shaft is so clamped as to bring the upwardly-turning muller-roll edge farther from the rim 22 than the downwardly-turning edge. As a result, material carried upwardly by the muller-rolls will fall within the pan instead of being spilled over its edge.

Figure 3:
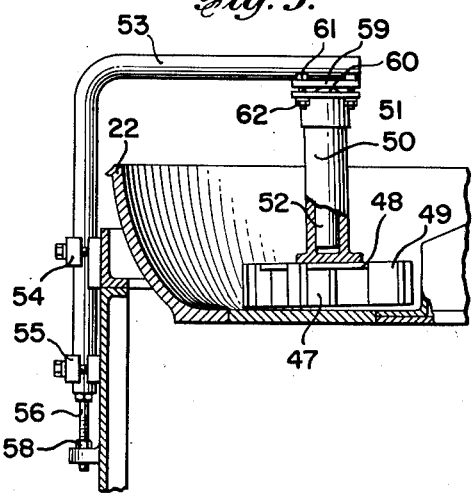
Figure 3 is a broken section taken on the line 3—3 of Figure 1, showing the adjustable agitator.
Figure 4:
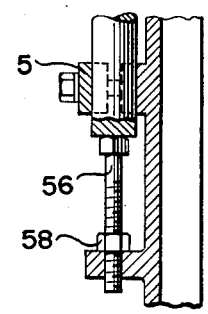
Figure 4 is a detail elevation of the adjustable agitator support shown in Figure 3.

A rotary agitator 47 is positioned in the pan for action in well-known manner to break up, agitate and mix material which has been pressed into cakes by the muller-rolls. In the present embodiment, the agitator is disposed between the two muller-rolls 18, 18 and substantially opposite the combined scraper and emptier disc 23. The agitator 47 (Figures 1 and 3) comprises a head formed by a plate 48 and feet 49 which extend outwardly and downwardly therefrom. The agitator 47 is fixedly attached to the bottom of a rotary hub 50 which, in operating position, extends upwardly therefrom to a position within a fixed flanged bushing 51, which surrounds the upper end of the hub. A stationary shaft 52 is made fast and fixedly secured in known or convenient manner within the stationary bushing 51, and extends downwardly therefrom within the hub 50 which rotates thereon. Thus, the agitator rotates about the shaft 52.

For best operation, the feet 49 must be in contact with the bottom of the pan near the rim 22, but must clear the bottom on the opposite side of the mixer. The shaft 52 must, therefore, incline downwardly away from the rim. See Figure 3.

As the bottoms of the feet 49 wear, it becomes necessary to adjust the position of the shaft 52 vertically. Such adjustment is effected by supporting the fixed flanged bushing 51 on a vertically adjustable support above the pan 10. As here shown, this support is a goose-neck 53 fastened as by clamps 54 and 55 to the stationary frame within which the pan is disposed. The gooseneck may be raised or lowered by loosening the clamps 54 and 55, loosening the nut 58, and turning the adjusting screw 56. Tightening the nut and the clamps fixes the assembly in position.

With continued operation of the mixer, the bottom of the pan will wear and become concave. This requires adjustment of the inclination of the agitator and hence means for adjusting the inclination of the stationary shaft 52. Novel means is provided for making this adjustment. Accordingly, a plate 59 is welded or otherwise fixed horizontally beneath the upper and outer end of the goose-neck 53, and a plurality of holes are made in this plate to register with similar holes formed in the flange of the bushing 51. Four such holes are illustrated in the drawings. The upper end of the stationary shaft 52 is given a spherical form 60 and the shaft is so fixed in the bushing 51 that its upper end projects beyond the flange formed thereon. Bolts 61 are passed through the registering holes in the plate 59 and the flange of the bushing 51, and nuts 62, threaded upon the bolts, draw the plate and bushing together with the spherical end 60 of the stationary shaft 52 in contact with the plate 59. Loosening and tightening the nuts 62 upon the bolts 61 permits adjustment of the inclination of the rotary hub 50 and stationary shaft 52. The holes formed in the plate 59 and in the flange on the bushing 51, together with the bolts 61 and nuts 62, constitute a connection between the plate and the shaft 52 for tilting the shaft angularly about its spherical upper end 60 and fixing the angle of the shaft with respect to the plate 59. Obviously other connections might effect the same result and adjust the inclination of the agitator 47 in the pan.

As the inclination of the shaft 52 to the vertical is increased, the agitator may come into contact with the central portion of the pan 10. To avoid this, it is merely necessary to loosen the clamps 54 and 55 and to swing the goose-neck in a horizontal plane. Thus, a third adjustment may be effected.

From the foregoing it will be apparent that the invention provides a novel pivot arrangement whereby a combined scraper and emptier disc may be caused to conform to the inner surface of a grinding and mixing pan in both of its operating positions. It will also be apparent that the invention makes it possible for large or hard pieces of foreign matter to pass beneath the disc without damage to the mixer parts. Furthermore the invention prevents spilling of material from the mixer by the muller-rolls. Finally, the agitator may be appropriately and easily adjusted as required.

The details of the invention herein described and illustrated in the drawings are presented merely as examples of how the invention may be applied. Other forms and embodiments of the invention coming within the proper scope of the appended claims will readily suggest themselves to those skilled in the mixing machine art.

I claim:

1. A mixing machine comprising a rotary pan, a rotary agitator positioned in said pan, a shaft upon which said agitator rotates, a support above said pan for said shaft, and means for adjusting the inclination of said agitator, said means comprising a spherically-formed upper end on said shaft, a plate fixed horizontally beneath said support, and a connection between said plate and said shaft for turning said shaft angularly about its spherical upper end and fixing the position of said shaft with respect to said plate.

2. A mixing machine comprising a rotary pan, a rotary agitator positioned in said pan, an upwardly-extending hub fixed to said agitator, a shaft upon which said hub rotates, a goose-neck extending above said pan for supporting said shaft, and clamps positioned outside of said pan for fixing said goose-neck in vertical and horizontal adjustment, in combination with means for adjusting the inclination of said agitator, said means comprising a spherically-formed upper end on said shaft, a plate fixed horizontally beneath the upper and outer end of said goose-neck, and a connection between said plate and said shaft for turning said shaft angularly about its spherical upper end and fixing the position of said shaft with respect to said plate.

References Cited in the file of this patent

UNITED STATES PATENTS

| Number | Name | Date |
|---|---|---|
| 548,072 | Langley | Oct. 15, 1895 |
| 563,145 | Duffield et al. | June 30, 1896 |
| 725,521 | Wegerif | Apr. 14, 1903 |
| 757,433 | Becht | Apr. 19, 1904 |
| 1,611,389 | Straight | Dec. 21, 1926 |
| 2,031,149 | Eirich et al. | Feb. 18, 1930 |
| 2,179,970 | Wallace | Nov. 14, 1939 |
| 2,270,164 | Du Rietz et al. | Jan. 13, 1942 |
| 2,316,562 | Clark | Apr. 13, 1943 |

FOREIGN PATENTS

| Number | Country | Date |
|---|---|---|
| 383,650 | France | Jan. 14, 1908 |
| 103,196 | Australia | May 4, 1937 |